March 5, 1963 KATSUO TANIMURA ET AL 3,080,249
METHOD OF MANUFACTURING POLYVINYL ALCOHOL FILMS
Filed Aug. 12, 1959
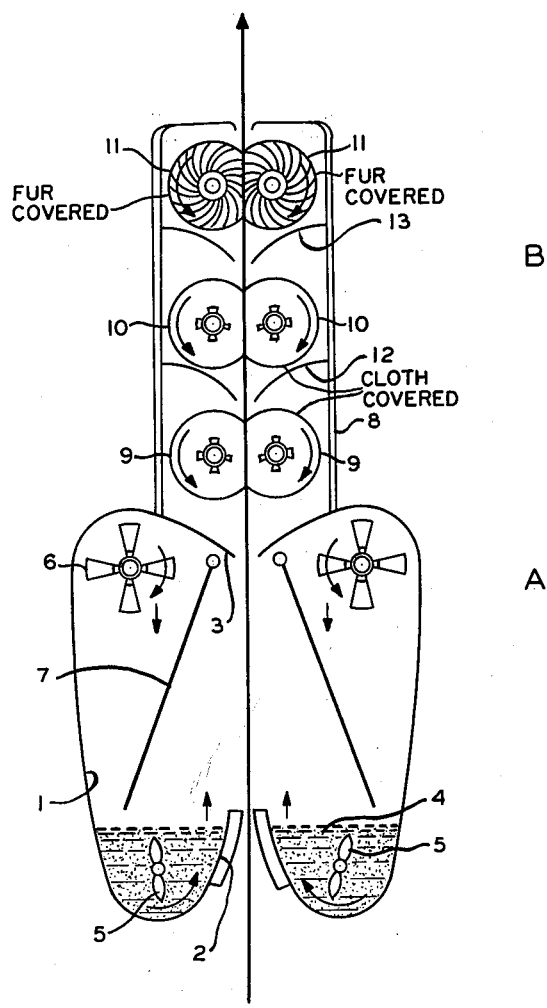
INVENTORS
KATSUO TANIMURA
SABURO KAWAMURA
HIDEO SUZUMURA
SEIICHI SAKAKIBARA
KOICHI NAGANO
BY William C. Long
ATTORNEY

3,080,249
METHOD OF MANUFACTURING POLYVINYL ALCOHOL FILMS

Katsuo Tanimura, Saburo Kawamura, Hideo Suzumura, and Seiichi Sakakibara, Okayama-ken, and Koichi Nagano, Osaka-fu, Japan, assignors to Kurashiki Rayon Co., Ltd., Okayama Prefecture, Japan, a corporation of Japan
Filed Aug. 12, 1959, Ser. No. 833,213
Claims priority, application Japan Aug. 12, 1958
8 Claims. (Cl. 117—9)

This invention relates to a method of manufacturing thin films of polyvinyl alcohol. More particularly this invention pertains to a novel method for the protection of polyvinyl alcohol films against adhesion, and to a novel apparatus for carrying out the process.

In order to make thin films of polyvinyl alcohol which are serviceable for general packaging purposes the films are customarily subjected to a humidity conditioning treatment in order to increase the softness and to raise the tear strength. For example, the thin film of polyvinyl alcohol, after heat treatment, is fed through a humidity conditioning tank which is maintained at a temperature of about 40° C. and a relative humidity of about 95%, for a period of 3 to 6 minutes in order to absorb moisture on both sides of the film. As a result of such absorption the water content of the film may rise as high as 8 to 10%. The softness of the film will be remarkably increased and the tear strength will be satisfactorily raised, but at the same time the surface of the film will show adhesive qualities thereby making the film tend to stick together. This adhesive property of the film causes great loss of working efficiency in certain manufacturing processes, for example in plastic bag manufacture, where the operations must be completed in a relatively short period of time.

A principal object of this invention is to provide a novel method for manufacturing thin films of polyvinyl alcohol which will have no tendency to stick together.

Another object of the invention is to provide an apparatus which is simple and easy to operate for lessening the tendency of thin polyvinyl alcohol films to adhere to each other.

Other objects and a fuller understanding of the invention may be had by referring to the following description, together with the accompanying drawing in which specific forms of the apparatus and operation of the process have been set forth for purposes of illustration.

According to this invention the thin film of polyvinyl alcohol to be treated is passed through a chamber wherein the film surfaces are contacted with microscopic grains of an adhesion inhibitor which adheres uniformly to the surfaces of the film. The film is then contacted with buffing means which rub the grains of adhesion inhibitor into the surfaces of the film thus permanently effecting a reduction in the adhesiveness of the film surfaces.

Referring now to the attached drawing, which is a longitudinal cross-section through an apparatus suitable for carrying out the invention, Unit A is a section where the microscopic grains of an adhesion inhibitor are contacted with the surfaces of the thin film. Unit B is a section where the microscopic grains of the adhesion inhibitor adhering to the surface of the thin film are thoroughly and uniformly rubbed into the surface of the film.

In unit A, part 1 is a casing which may have a globular, cylindrical, conical, or the like shape. The inlet and outlet parts of casing 1 are suitably curved as indicated. Part 2 is an inlet guide and part 3 is an outlet guide, which guides are located at central positions facing each other. Microscopic grains 4 of the adhesion inhibitor are contained in unit A. Agitators 5 are installed in a central position to agitate the adhesion inhibitor. Fans 6 are arranged at the circumference of outlet 3 so that the grains of the adhesion inhibitor may be fed back to the inlet 2 by means of flow-direction regulating plates 7 which have an appropriate inclination.

In unit B, a cylindrical casing 8 is connected with outlet 3 of part A. On both sides of the center line of casing 8 where the thin film passes through, buff-rolls 9 and 10 made of cloth and buff-roll 11 made of fur, or imitation fur, are installed in sequence. Between these rolls, partition plates 12 and 13 are fitted so as to separate the sets of rolls.

It is preferable to couple unit A with unit B in a vertical construction as shown in the attached drawing. Units A and B, however, may be satisfactorily arranged in a horizontal connection, if desired.

For operating the process, the thin film of polyvinyl alcohol is first led into casing 1 of unit A through guide inlet 2. The microscopic grains of an adhesive inhibitor 4 are distributed throughout the zone inside the casing of unit A by the operation of agitators 5, fans 6 which bring about the air flow required to fly the microscopic grains in all directions, and air flow direction regulating plates 7 which are inclined so as to feed back the microscopic grains to inlet 2. The agitators 5 rotate in opposite direction to fans 6. Fans 6 revolve at a rate of 100 to 500 revolutions per minute.

The preferred adhesion inhibitor for use in the invention is hydrous silicic acid. However, other similar inhibitors can be employed.

The following example is given to illustrate the method of the invention and is not intended to limit the invention in any way.

Example 1

An adhesion inhibitor comprising microscopic grains having a grain size of 4 to 13 millimicrons of hydrous silicic acid of 99.9% purity were placed in unit A of the apparatus described in the drawing. Fans 5 for flying the fine grains were rotated at the rate of 340 revolutions per minute. When the air flow produced by the rotation of the fans was blown against the surface of fine grains 4 the interior of unit A was completely filled with fine grains in sufficient density. The thin film of polyvinyl alcohol was fed into this chamber through guide inlet 2 at a speed of 10 meters per minute with the result that the fine grains evenly adhered to the surface of the thin film.

The fine grains were effectively retained on the surface of the thin film by subsequently passing the film through unit B where the surface of the film was gently rubbed with buff-rolls 9, 10 and 11 which rotated at the rate of 340 revolutions per minute. Buff-rolls 9 and 10 were made of fibers napped on the surface of the rolls. Buff-rolls 11 were made of rabbit's fur planted on the surface of the roll.

The quantity of the adhesive inhibitor sticking to the surface of the film was 0.01 to 0.05 gram per square meter. The resulting film had no detrimental adhesiveness and there was no deterioration of the transparency of the film.

What we claim is:

1. The method for reducing the adhesiveness of polyvinyl alcohol film surfaces which comprises contacting said film surfaces with particles of a finely divided granular adhesion inhibitor to distribute said inhibitor particles upon said surfaces and then buffing the film surfaces to imbed said particles of said inhibitor in the said film and thus to reduce the film surface adhesiveness.

2. The method of claim 1 wherein said inhibitor is hydrous silicic acid.

3. A method for reducing the adhesiveness of polyvinyl alcohol film surfaces which comprises the steps of passing a polyvinyl alcohol film into a first zone, blowing particles of a finely-divided granular adhesion inhibitor into contact with the surfaces of said film, moving said film into a second zone, and buffing the surfaces of said film in said second zone to imbed said inhibitor particles in said film to reduce the film surface adhesiveness.

4. A method as defined in claim 3, wherein said inhibitor is hydrous silicic acid.

5. A method for reducing the adhesiveness of polyvinyl alcohol film surfaces which comprises the steps of passing a polyvinyl alcohol film into a first zone, blowing particles of a finely-divided granular adhesion inhibitor into contact with the surfaces of said film, moving said film into a second zone, and buffing the surfaces of said film with fur in said second zone to imbed said inhibitor particles in said film to reduce the film surface adhesiveness.

6. A method as defined in claim 5, wherein said inhibitor is hydrous silicic acid.

7. An apparatus for reducing the adhesiveness of polyvinyl alcohol film surfaces which comprises means defining a first confined zone for receiving a polyvinyl alcohol film, blowing means in said first zone for blowing particles of a finely-divided granular adhesion inhibitor into contact with the surfaces of said film, means defining a second confined zone for receiving said film, means separating said first zone from said second zone except for a confined passage for the movement of said film from said first zone into said second zone, and a plurality of spaced-apart pairs of rotating buffing members in said second zone for buffing the surfaces of said film in said second zone to imbed said inhibitor particles in said film to reduce the film surface adhesiveness.

8. An apparatus as defined in claim 7, wherein said second zone overlies said first zone and wherein said buffing members comprise counter-rotating fur-covered members positioned to receive the film between them.

References Cited in the file of this patent

UNITED STATES PATENTS

| | | |
|---|---|---|
| Re. 22,419 | Smyser | Jan. 11, 1944 |
| 2,008,815 | Brandenberger et al. | July 23, 1935 |
| 2,017,449 | Thompson et al. | Oct. 15, 1935 |
| 2,057,548 | Wallach et al. | Oct. 13, 1936 |
| 2,262,689 | McDowell et al. | Nov. 11, 1941 |
| 2,306,400 | Menzel | Dec. 29, 1942 |
| 2,634,459 | Irons | Apr. 14, 1953 |
| 2,673,520 | Bainbridge | Mar. 20, 1954 |
| 2,978,349 | Walsh et al. | Apr. 4, 1961 |